United States Patent
Roth et al.

(10) Patent No.: US 10,344,144 B2
(45) Date of Patent: Jul. 9, 2019

(54) STRESS-CRACK-RESISTANT, HALOGEN-FREE, FLAME-PROTECTED POLYESTER

(71) Applicant: BASF SE, Ludwigshafen (DE)

(72) Inventors: Michael Roth, Lautertal (DE); Klaus Uske, Bad Dürkheim (DE); Sebastian Wagner, Ludwigshafen (DE); Ulli Wolf, Worms (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/786,177

(22) PCT Filed: Apr. 15, 2014

(86) PCT No.: PCT/EP2014/057577
§ 371 (c)(1),
(2) Date: Oct. 22, 2015

(87) PCT Pub. No.: WO2014/173726
PCT Pub. Date: Oct. 30, 2014

(65) Prior Publication Data
US 2016/0060431 A1    Mar. 3, 2016

(30) Foreign Application Priority Data

Apr. 25, 2013   (EP) .................................... 13165283

(51) Int. Cl.
*C08K 5/5313*   (2006.01)
*C08K 5/1515*   (2006.01)
*C08K 5/3492*   (2006.01)

(52) U.S. Cl.
CPC .......... *C08K 5/5313* (2013.01); *C08K 5/1515* (2013.01); *C08K 5/34922* (2013.01)

(58) Field of Classification Search
None
See application file for complete search history.

(56) References Cited

U.S. PATENT DOCUMENTS

| | | | |
|---|---|---|---|
| 4,391,938 A | 7/1983 | Memon et al. | |
| 5,496,887 A | 3/1996 | Braune | |
| 5,733,959 A | 3/1998 | Heitz et al. | |
| 6,503,969 B1 | 1/2003 | Klatt et al. | |
| 7,375,167 B2 | 5/2008 | Natarajan et al. | |
| 2006/0057408 A1 | 3/2006 | Kliesch et al. | |
| 2006/0142442 A1 | 6/2006 | Scherzer et al. | |
| 2010/0120946 A1 | 5/2010 | Kliesch et al. | |
| 2011/0319536 A1 | 12/2011 | Ding et al. | |
| 2013/0210968 A1* | 8/2013 | Hoerold | C08K 5/53 524/89 |

FOREIGN PATENT DOCUMENTS

| | | |
|---|---|---|
| CN | 103003359 A | 3/2013 |
| DE | 4401055 A1 | 7/1995 |
| EP | 794 974 A1 | 9/1997 |
| EP | 1 634 915 A1 | 3/2006 |
| EP | 1 935 944 A2 | 6/2008 |
| EP | 2 184 312 A1 | 5/2010 |
| JP | H01163259 A | 6/1989 |
| JP | H01221448 A | 9/1989 |
| JP | 2002513831 A | 5/2002 |
| JP | 2006517605 A | 7/2006 |
| JP | 2009292897 A | 12/2009 |
| WO | WO-2004/069912 A1 | 8/2004 |
| WO | WO-2006/120184 A1 | 11/2006 |

OTHER PUBLICATIONS

International Search Report in International Patent Application No. PCT/EP2014/057577, dated Jun. 12, 2014.
Office Action in CN Patent Application No. 201480036185.X, dated Mar. 22, 2017 (7 pages of English translation).

* cited by examiner

*Primary Examiner* — Robert T Butcher
(74) *Attorney, Agent, or Firm* — Marshall, Gerstein & Borun LLP

(57) ABSTRACT

1. The invention relates to the use of polyester molding compositions composed of
   A) from 20 to 97.9% by weight of a thermoplastic polyester
   B) from 0.1 to 10% by weight of an epoxidized natural oil or fatty acid ester, or mixture of these, where the epoxide equivalent weight of component B) in accordance with DIN EN ISO 3001 is from 100 to 400 g/eq
   C) from 1 to 20% by weight of a metal salt of a phosphinic acid
   D) from 1 to 20% by weight of a melamine compound
   E) from 0 to 60% by weight of other additional substances,
   where the total of the percentages by weight of components A) to E) is 100%, for the production of stress-cracking-resistant and halogen-free flame-retardant polyester molding compositions.

20 Claims, No Drawings

STRESS-CRACK-RESISTANT, HALOGEN-FREE, FLAME-PROTECTED POLYESTER

CROSS-REFERENCE TO RELATED APPLICATION

This is the U.S. national phase of International Application No. PCT/EP2014/057577, filed Apr. 15, 2014, which claims the benefit of European Patent application No. 13165283.6, filed Apr. 25, 2013.

The invention relates to the use of polyester molding compositions composed of
- A) from 20 to 97.9% by weight of a thermoplastic polyester
- B) from 0.1 to 10% by weight of an epoxidized natural oil or fatty acid ester, or mixture of these, where the epoxide equivalent weight of component B) in accordance with DIN EN ISO 3001 is from 100 to 400 g/eq
- C) from 1 to 20% by weight of a metal salt of a phosphinic acid
- D) from 1 to 20% by weight of a melamine compound
- E) from 0 to 60% by weight of other additional substances, where the total of the percentages by weight of components A) to E) is 100%, for the production of stress-cracking-resistant and halogen-free flame-retardant polyester molding compositions.

The invention further relates to the moldings of any type obtainable according to the claimed use.

Thermoplastic polyesters are materials with a long history of use, based on their dimensional stability. Examples of properties that are becoming increasingly important for these materials, alongside their mechanical, thermal, electrical, and chemical properties, are resistance to hydrolysis and resistance to aqueous alkalis. Examples of applications here are those in the electronics sector (e.g. protective covers for circuit breakers) and automobile sector (e.g. plugs, sensors, housing parts). The applications mentioned require improved stability during storage in a basic environment and/or in hot humid conditions.

The market is moreover increasingly interested in polyester molding compositions comprising halogen-free flame-retardancy systems. The essential requirements placed upon the flame retardant here are pale intrinsic color, adequate thermal stability during polymer processing, and also effective flame retardancy in the reinforced and unreinforced polymer.

However, flame-retardant thermoplastic polyester molding compositions generally have reduced resistance to hydrolysis, since firstly there is a reduction in the proportion of polymer matrix and secondly there is also the possibility of adverse interactions between water, flame retardant, and polymer matrix.

According to the prior art, although the use of (poly)carbodiimides (EP-A-794 974) or of (poly)epoxy compounds (DE T1 69231831) improves melt stability, the polyester compositions described have disadvantages in processing, due in particular to molecular weight increase and resultant high melt viscosity.

WO2004/069912, WO2006/120184, and U.S. Pat. No. 73,751,671 disclose polyester molding compositions with epoxidized natural oils, but these additives are used for resistance to hydrolysis. The teaching of WO2004/069912 and WO2006/120184 does not reveal any flame-retardant stress-cracking-resistant polyester composition.

JP01/221448 discloses that halogen-containing flame-retardant polyester molding compositions can be rendered resistant to hydrolysis through addition of epoxy compounds and of polyolefins.

It was therefore an object of the present invention to provide polyester molding compositions and/or moldings which have increased stress-cracking resistance, in particular in relation to aqueous alkalis, and at the same time have a halogen-free flame-retardancy system.

Accordingly, the uses defined in the introduction have been found. Preferred embodiments can be found in the dependent claims.

Surprisingly, it has been found that the use of epoxidized natural oils and/or of fatty acid esters can produce polyester molding compositions which have a halogen-free flame-retardancy system and which have excellent stress-cracking resistance. At the same time, flame-retardancy properties, resistance to hydrolysis, and electrical properties comply with the requirements profile for applications mentioned, in particular in the electrical and electronics sector.

The molding compositions that can be used in the invention comprise, as component A), from 20 to 97.9% by weight, preferably from 30 to 97% by weight, and in particular from 35 to 88% by weight, of at least one thermoplastic polyester.

Polyesters A) generally used are those based on aromatic dicarboxylic acids and on an aliphatic or aromatic dihydroxy compound.

A first group of preferred polyesters is provided by polyalkylene terephthalates, in particular those having from 2 to 10 carbon atoms in the alcohol moiety.

Polyalkylene terephthalates of this type are known per se and are described in the literature. Their main chain comprises an aromatic ring which derives from the aromatic dicarboxylic acid. There may also be substitution in the aromatic ring, e.g. by a halogen, such as chlorine or bromine, or by $C_1$-$C_4$-alkyl groups, such as methyl, ethyl, iso- or n-propyl, or n-, iso- or tert-butyl groups.

These polyalkylene terephthalates may be produced by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid or mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexane-dicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The intrinsic viscosity of the polyesters (A) is generally in the range from 50 to 220 ml/g, preferably from 80 to 160 ml/g (measured in 0.5% by weight solution in a phenol/o- dichlorobenzene mixture in a ratio by weight of 1:1) at 25° C. in accordance with ISO 1628.

Particular preference is given to polyesters whose carboxy end group content is up to 100 meq/kg of polyester, preferably up to 50 meq/kg of polyester and in particular up to 40 meq/kg of polyester. Polyesters of this type may be produced, for example, by the process of DE-A 44 01 055. The carboxy end group content is usually determined by titration methods (e.g. potentiometry).

Particularly preferred molding compositions comprise, as component A), a mixture of polyesters, other than PBT, an example being polyethylene terephthalate (PET). An example of the proportion of the polyethylene terephthalate in the mixture is preferably up to 50% by weight, in particular from 1.0 to 35% by weight, based on 100% by weight of A).

It is also advantageous to use PET recyclates (also termed scrap PET) optionally in a mixture with polyalkylene terephthalates, such as PBT.

Recyclates are generally:
1) those known as post-industrial recyclates: these are production wastes during polycondensation or during processing, e.g. sprues from injection molding, start-up material from injection molding or extrusion, or edge trims from extruded sheets or films.
2) post-consumer recyclates: these are plastics items which are collected and treated after utilization by the end consumer. Blow-molded PET bottles for mineral water, soft drinks and juices are easily the predominant items in terms of quantity.

Both types of recyclate may be used either as regrind or in the form of pellets. In the latter case, the crude recycled materials are isolated and purified and then melted and pelletized using an extruder. This usually facilitates handling and free-flowing properties, and metering for further steps in processing.

The recycled materials used may take the form of pellets or regrind. The edge length should not be more than 10 mm and should preferably be less than 8 mm.

Because polyesters undergo hydrolytic cleavage during processing (due to traces of moisture) it is advisable to predry the recycled material. Residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

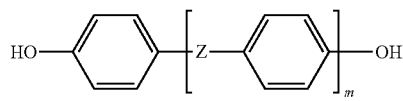

in which Z is an alkylene or cycloalkylene group having up to 8 carbon atoms, an arylene group having up to 12 carbon atoms, a carbonyl group, a sulfonyl group, an oxygen atom or sulfur atom, or a chemical bond, and in which m has the value from 0 to 2. The phenylene groups in the compounds may also have substitution by $C_1$-$C_6$-alkyl groups or alkoxy groups, and fluorine, chlorine, or bromine.

Examples of parent compounds for these compounds are
dihydroxybiphenyl,
di(hydroxyphenyl)alkane,
di(hydroxyphenyl)cycloalkane,
di(hydroxyphenyl) sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl)sulfone, di(hydroxybenzoyl)benzene,
resorcinol and hydroquinone and also the ring-alkylated and ring-halogenated derivatives of these.

Among these preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

It is preferable to use, as component B), those epoxidized compounds in which epoxy groups are not terminal (the location of the epoxy groups being "internal" within the hydrocarbon chain).

The content of epoxy groups is preferably from 1 to 20% by weight, with preference from 4 to 15% by weight, and in particular from 6 to 12% by weight, based on the respective component B).

Preferred natural oils are olive oil, linseed oil, palm oil, groundnut oil, coconut oil, tung oil, rapeseed oil, castor oil, cod liver oil, or a mixture of these, and particular preference is given here to soybean oil and linseed oil.

The molecular weight of oils of this type is preferably from 500 to 1500, in particular from 600 to 1100. Linseed or soybean oils of this type are mixtures of fatty acid triglycerides, with predominant $C_{18}$-carboxylic acid content.

The molding compositions that can be used in the invention comprise, as component B), from 0.1 to 10% by weight, preferably from 0.5 to 7% by weight, and in particular from 1 to 5% by weight, of epoxidized natural oils or epoxidized fatty acid esters or a mixture of these with epoxide equivalent weight (EEW) from 100 to 400 g/eq, in particular from 125 to 375 g/eq, preferably from 150 to 250 g/eq in accordance with DIN EN ISO 3001 (1999-11). (EEW gives the solids content associated with each epoxy group in the relevant substance in g, see also Römpp-Online, 2013.)

The epoxidized fatty acid esters can generally be produced from said natural oils by methods familiar to the person skilled in the art.

Preference is given to use of esters of saturated or unsaturated aliphatic carboxylic acids having from 10 to 40, preferably from 16 to 22, carbon atoms with saturated aliphatic alcohols having from 2 to 40, preferably from 2 to 6, carbon atoms.

The carboxylic acids can be mono- or dibasic. Examples that may be mentioned are pelargonic acid, palmitic acid, lauric acid, margaric acid, dodecanedioic acid, behenic acid, and particularly preferably stearic acid, capric acid, and also montanic acid (mixture of fatty acids having from 30 to 40 carbon atoms), linoleic acid, linolenic acid, and eleostearic acid and oleic acid.

The aliphatic alcohols can be mono- to tetrahydric. Examples of alcohols are n-butanol, n-octanol, stearyl alcohol, ethylene glycol, propylene glycol, neopentyl glycol, pentaerythritol, myricyl alcohol, and cetyl alcohol, and preferably glycerol.

It is also possible to use mixtures of various esters and/or oils.

It is preferable that component B) comprises unsaturated fatty acid fractions corresponding to an iodine number (in accordance with DIN 53995) of from 130 to 180, and in particular from 120 to 200, mg of iodine per gram of substance.

The epoxide function is introduced into the abovementioned oils and/or esters by way of reaction of these with epoxidizing agents, e.g. peracids, such as peracetic acid. Reactions of this type are known to the person skilled in the art, and no further information is therefore required in this connection.

The molding compositions that can be used in the invention comprise, as component C), from 1 to 20% by weight, preferably from 1 to 15% by weight, and in particular from 5 to 15% by weight, based on A) to E), of a phosphinic salt.

Compounds suitable as component C) are metal salts of phosphinic acids of the formula

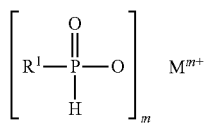

(I)

where
R¹=hydrogen, phenyl, methyl, ethyl, propyl, butyl, pentyl, octyl, phenyl, or

R'=hydrogen, phenyl, tolyl,
M=Mg, Ca, Al, Zn,
m=from 1 to 4

It is preferable that $R^1$ of component C) is methyl, ethyl, n-propyl, isopropyl, n-butyl, tert-butyl, n-pentyl, octyl, and/or phenyl.

It is particularly preferable that $R^1$ is hydrogen, methyl, ethyl, and that M=Al, Mg, Ca, Zn, where Al hypophosphite is particularly preferred.

The phosphinates are preferably produced via precipitation of the appropriate metal salts from aqueous solutions. However, the phosphinates can also be precipitated in the presence of a suitable inorganic metal oxide or metal sulfide as support material (white pigments, e.g. $TiO_2$, $SnO_2$, ZnO, ZnS, $SiO_2$).

The molding compositions that can be used in the invention comprise, as component D), from 1 to 20% by weight, preferably from 1 to 15% by weight, and in particular from 5 to 15% by weight, of a melamine compound.

Melamine cyanurate is preferably suitable in the invention (component D) and is a reaction product of preferably equimolar amounts of melamine (formula I) and cyanuric acid or isocyanuric acid (formulae Ia and Ib).

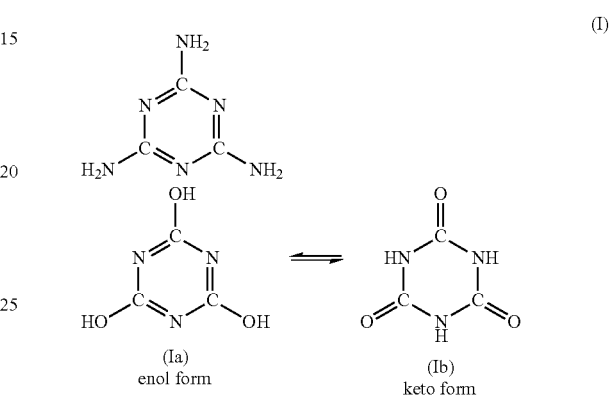

It is obtained by way of example via reaction of aqueous solutions of the starting compounds at from 90 to 100° C. The product obtainable commercially is a white powder with a median grain size $d_{50}$ of from 1.5 to 7 μm and with a $d_{99}$ value smaller than 50 μm.

Other suitable compounds (often also termed salts or adducts) are melamine sulfate, melamine, melamine borate, melamine oxalate, melamine phosphate prim., melamine phosphate sec., and melamine pyrophosphate sec., melamine neopentyl glycol borate, and also polymeric melamine phosphate (CAS No. 56386-64-2 or 218768-84-4).

The molding compositions that can be used in the invention can comprise, as component E), from 0 to 60% by weight, in particular up to 50% by weight, of other additional substances.

Compounds that can also be used as component E) are ethylene copolymers, ethylene-propylene copolymers, polyester elastomers, or thermoplastic polyurethanes (known as rubbers) in amounts of up to 25% by weight.

In very general terms, these involve copolymers which are preferably composed of at least two of the following monomers: ethylene, propylene, isobutene, chloroprene, vinyl acetate, styrene, acrylonitrile, and acrylic or methacrylic esters having from 1 to 18 carbon atoms in the alcohol component.

Polymers of this type are described by way of example in Houben-Weyl, Methoden der organischen Chemie [Methods of organic chemistry], vol. 14/1 (Georg-Thieme-Verlag, Stuttgart, 1961), pp. 392 to 406, and in the monograph by C. B. Bucknall, "Toughened Plastics" (Applied Science Publishers, London, 1977). Preference is given to MA-modified ethylene-acrylate copolymers.

The molding compositions of the invention can comprise, as component E), from 0 to 5% by weight, preferably from 0.05 to 3% by weight, and in particular from 0.1 to 2% by weight, of at least one ester or amide of saturated or unsaturated aliphatic carboxylic acids having from 10 to 40, preferably from 16 to 22, carbon atoms with saturated aliphatic alcohols or amines having from 2 to 40, preferably from 2 to 6, carbon atoms.

The carboxylic acids can be mono- or dibasic. Examples that may be mentioned are pelargonic acid, palmitic acid, lauric acid, margaric acid, dodecanedioic acid, behenic acid, and particularly preferably stearic acid, capric acid, and also montanic acid (mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, pentaerythritol, preference being given here to glycerol and pentaerythritol.

The aliphatic amines can be mono- to trifunctional. Examples here are stearylamine, ethylenediamine, propylenediamine, hexamethylenediamine, di(6-aminohexyl) amine, where ethylenediamine and hexamethylenediamine are particularly preferred. Preferred esters or amides are accordingly glycerol distearate, glycerol tristearate, ethylenediamine distearate, glycerol monopalmitate, glycerol trilaurate, glycerol monobehenate, and pentaerythritol tetrastearate.

It is also possible to use mixtures of various esters or amides or esters with amides in combination, in any desired mixing ratio.

Fibrous or particulate fillers E) which may be mentioned are carbon fibers, glass fibers, glass beads, amorphous silica, asbestos, calcium silicate, calcium metasilicate, magnesium carbonate, kaolin, chalk, powdered quartz, mica, barium sulfate, and feldspar, the amounts used of these being up to 60% by weight, in particular up to 50% by weight.

Preferred fibrous fillers which may be mentioned are carbon fibers, aramid fibers, and potassium titanate fibers, particular preference being given to glass fibers in the form of E glass. The forms used of these may be the commercially available forms of chopped glass or rovings.

The fibrous fillers may have been surface-pretreated with a silane compound to improve compatibility with the thermoplastics.

Suitable silane compounds are those of the general formula

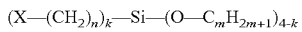

where the substituents are:
X NH$_2$—,

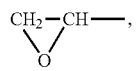

n is a whole number from 2 to 10, preferably from 3 to 4
m is a whole number from 1 to 5, preferably from 1 to 2
k is a whole number from 1 to 3, preferably 1

Preferred silane compounds are am inopropyltrimethoxysilane, am inobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.05 to 5% by weight, preferably from 0.5 to 1.5% by weight, and in particular from 0.8 to 1% by weight (based on E).

Acicular mineral fillers are also suitable.

For the purposes of the invention, acicular mineral fillers are mineral fillers with very pronounced acicular character. An example which may be mentioned is acicular wollastonite. The L/D (length/diameter) ratio of the mineral is preferably from 8:1 to 35:1, with preference from 8:1 to 11:1. Optionally, the mineral filler may have been pretreated with the abovementioned silane compounds; however, this pretreatment is not essential.

Other fillers which may be mentioned are kaolin, calcined kaolin, talc powder, and chalk. The thermoplastic molding compositions of the invention can comprise, as component F, conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers that may be mentioned, where the amounts used of these are generally up to 2% by weight, based on the molding composition, are various substituted resorcinols, salicylates, benzotriazoles, and benzophenones.

Transesterification stabilizers that may be mentioned are Irgafos® PEPQ, and also phosphates (e.g. monozinc phosphate).

Colorants which may be added are inorganic pigments, such as titanium dioxide (rutile or anatase types), ultramarine blue, iron oxide, ZnO, ZrO$_2$, SnO$_2$, ZnS, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc powder.

Other lubricants and mold-release agents are usually used in amounts of up to 1% by weight. Preference is given to long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), or calcium montanate or sodium montanate, or low-molecular-weight polyethylene waxes or low-molecular-weight polypropylene waxes.

Examples of plasticizers which may be mentioned are dioctyl phthalates, dibenzyl phthalates, butyl benzyl phthalates, hydrocarbon oils and N-(n-butyl)benzenesulfonamide.

The inventive molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-containing ethylene polymers have homogeneous distribution in the molding compositions and preferably have a particle size d$_{50}$ (numeric average) in the range from 0.05 to 1 μm, in particular from 0.1 to 5 μm. These small particle sizes can particularly preferably be achieved by the use of aqueous dispersions of fluorine-containing ethylene polymers and the incorporation of these into a polyester melt.

The inventive thermoplastic molding compositions may be produced by methods known per se, by mixing the starting components in conventional mixing apparatuses, such as screw extruders, Brabender mixers or Banbury mixers, and then extruding them. The extrudate may be cooled and comminuted. It is also possible to premix individual components and then to add the remaining starting materials individually and/or likewise in a mixture. The mixing temperatures are generally from 230 to 290° C.

In another preferred mode of operation, the other components can be mixed with a polyester prepolymer, compounded, and pelletized. The resultant pellets are then solid-phase condensed under inert gas continuously or batchwise at a temperature below the melting point of component A) until the desired viscosity is reached.

The thermoplastic molding compositions of the invention feature good processing and good thermal stability together with good mechanical properties. In particular, there is a significant improvement in processing stability at high temperatures, and in weathering resistance.

The materials are suitable for producing fibers, foils, and moldings of any type, in particular for applications as plugs, switches, housing parts, housing covers, headlamp bezels, shower heads, fittings, smoothing irons, rotary switches, stove controls, fryer lids, door handles, (rear) mirror housings, (tailgate) screen wipers, and sheathing for optical conductors.

Electrical and electronic applications which can be produced using the polyesters of the invention are plugs, plug components, plug connectors, cable harness components, cable mounts, cable mount components, three-dimensionally injection-molded cable mounts, electrical connector elements, mechatronic components, and optoelectronic components.

Possible uses in automobile interiors are dashboards, steering column switches, seat components, headrests, center consoles, gearbox components, and door modules, and possible automobile exterior applications are door handles, headlamp components, exterior mirror components, windshield wiper components, windshield wiper protective housings, grilles, roof rails, sunroof frames, and exterior bodywork parts.

Possible uses of the polyesters in the kitchen and household sector are production of components for kitchen equipment, e.g. fryers, smoothing irons, buttons, and also garden and leisure sector applications, such as components for irrigation systems or garden equipment.

EXAMPLES

Component A
Polybutylene terephthalate with intrinsic viscosity IV 107 ml/g and with terminal carboxy content 34 meq/kg (Ultradur® B 2550 from BASF SE) (IV measured in 0.5% by weight solution in phenol/o-dichlorobenzene, 1:1 mixture) at 25° C. in accordance with DIN 53728/ISO.

Component B:
Epoxidized linseed oil (epoxy content: about 9% by weight. Vikoflex 7190 from Arkema, EEW=174 g/eq).

Component C:
Al hypophosphite

Component C/comp:
Al diethylphosphinate

Component D/1:
Melamine cyanurate with median particle size ~2.6 μm (Melapur MC 25® from BASF SE).

Component D/2:
Melamine polyphosphate

Component E/1:
Standard chopped glass fiber for polyester with average thickness 10 μm.

Component E21/E22/E23:
Mixture (0.3+0.5% by weight) of an oxidized polyethylene wax (acid number: from 15 to 19 mg KOH/g), pentaerythritol tetrastearate, and 1.0% by weight of polypropylenehomopolymer (MFR=25 g/10 min. for 230° C./2.16 kg load in accordance with ISO 1133).

Component E/3:
Commercially available epoxy resin based on bisphenol A (Araldite GT7077 from Huntsman), EEW≈from 1490 to 1640 g/eq.

Component E/4:
Commercially available carbon black (Spezialschwarz IV from Orion Engineered Carbons GmbH).

Production of the Molding Compositions/Test Specimens

In order to demonstrate the process described in the invention for the production of polyester moldings resistant to hydrolysis and comprising a halogen-free flame-retardant system, appropriate plastics molding compositions were prepared by compounding. For this, the individual components were mixed in a ZSK 26 (Berstorff) twin-screw extruder at 20 kg/h throughput and at about 240-270° C. with a flat temperature profile, extruded in the form of strand, cooled until pelletizable, and pelletized. The test specimens for the tests shown in table 2 were injection-molded at a melt temperature of about 260° C. and a mold temperature of about 80° C. in an Arburg 420C injection-molding machine.

The proportions of components A) to E) in table 1 (comparative example=comp 1, comp 2, comp 3, inventive example=inv 1) give a total of 100% by weight. The table shows the constitutions of the molding compositions and the results of the tests.

TABLE 1

| Components [% by weight] | comp 1 | comp 2 | comp 3 | comp 4 | inv 1 |
|---|---|---|---|---|---|
| A | 53.15 | 51.15 | 54.2 | 47.15 | 47.15 |
| B | — | — | — | 3.00 | 4.00 |
| C | 12.6 | 12.6 | 12.6 | — | 12.6 |
| C/comp | — | — | — | 15 | — |
| D/2 | — | — | — | 4.50 | — |
| D/1 | 7.40 | 7.40 | 7.4 | 3.00 | 7.40 |
| E/1 | 25.0 | 25.0 | 25.0 | 25.0 | 25.0 |
| E21/E22/E23 | 1.80 | 1.80 | 0.80 | 0.80 | 1.80 |
| E/3 | — | 2.00 | — | 1.00 | 2.00 |
| E/4 | 0.05 | 0.05 | — | — | 0.05 |

The test specimens for the tensile stress tests were produced in accordance with ISO 527-2:/1993.

The MVR measurements were made in accordance with ISO 1133.

The flame retardancy of the molding compositions was firstly determined by the UL 94 V method (Underwriters Laboratories Inc. Standard of Safety: "Test for Flammability of Plastic for Parts in Devices and Appliances", pp. 14 to 18, Northbrook, 1998).

Glow-wire resistance GWFI (Glow-Wire Flammability Index) was tested on sheets in accordance with IEC 60695-2-12. GWFI is a general suitability test for plastics in contact with parts that carry electrical potential. The temperature determined is the highest at which one of the following conditions is met in 3 successive tests: (a) no ignition of the specimen or (b) after-flame or afterglow time ≤30 s after end of exposure to the glow wire, and no ignition of the underlay.

The heat-aging of the test specimens in water vapor (hydrolysis test) was carried out at 110° C./100% humidity in an autoclave. For this, the specimen material was heated to 110° C. in an autoclave in separate test vessels respectively for 4 and 8 days, with addition of water. After the appropriate times, the specimens were removed and dried, and subjected to the appropriate test.

Resistance to stress cracking in relation to 10% aqueous sodium hydroxide solution was tested at room temperature. For this, tensile specimens (produced in accordance with ISO 527-2:/1993) were clamped into a metal frame with 2% outer fiber strain, and a brush was used to coat the central portion of the test specimen with 10% aqueous sodium hydroxide solution. After 10 minutes of exposure time, the specimens were dried with a cloth and rewetted. This procedure was repeated a total of 5 times. The specimens were then subjected to one further brush-coating procedure, and stored at room temperature and assessed visually after 24 hours and after 2 and 4 weeks.

epoxide equivalent weight of component B) in accordance with DIN EN ISO 3001 is from 100 to 400 g/eq C) from 1 to 20% by weight of at least one metal salt of a phosphinic acid of the formula

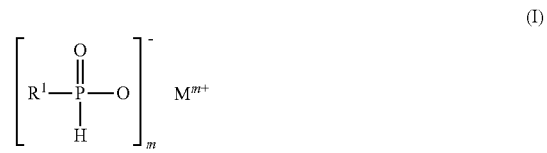

where
R$^1$=hydrogen, phenyl, methyl, ethyl, propyl, butyl, pentyl, octyl, phenyl, or

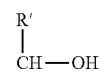

R'=hydrogen, phenyl, tolyl,
M=Mg, Ca, Al, Zn, and
m=from 1 to 4

TABLE 2

|  | comp 1 | comp 2 | comp 3 | comp 4 | inv 1 |
| --- | --- | --- | --- | --- | --- |
| Values prior to aging |  |  |  |  |  |
| IV/[ml/g] | 99 | 108 | 97 | 81 | 105 |
| MVR 275/2.16 [ccm/10 min] | 21.0 | 18.0 | 29.0 | 62.0 | 24.0 |
| Tensile modulus of elasticity [MPa] | 10200 | 10400 | 10300 | 9280 | 8550 |
| Tensile stress at break [MPa] | 122 | 130 | 119 | 90.3 | 119 |
| Tensile strain at break [%] | 2.2 | 2.1 | 2.2 | 1.5 | 2.5 |
| UL 94 (1.6 mm) | V-0 | V-0 | V-0 | V-0 | V-0 |
| GWFI 960° C./1.0 mm | passed | passed | passed | passed | passed |
| Values after 4 days of aging at 110° C./100% humidity |  |  |  |  |  |
| IV/[ml/g] | 73 | 83 | 54 | 47 | 96 |
| Tensile modulus of elasticity [MPa] | 9100 | 9500 | 9200 | 8390 | 8050 |
| Tensile stress at break [MPa] | 70 | 76 | 49 | 54 | 96 |
| Tensile strain at break [%] | 1.0 | 1.1 | 0.6 | 0.9 | 2.1 |
| Values after 8 days of aging at 110° C./100% humidity |  |  |  |  |  |
| IV/[ml/g] | 49 | 60 | 35 | 34 | 73 |
| Tensile modulus of elasticity [MPa] | 8850 | 9100 | 7900 | 7160 | 7800 |
| Tensile stress at break [MPa] | 41 | 41 | 29 | 35 | 76 |
| Tensile strain at break [%] | 0.5 | 0.5 | 0.5 | 0.7 | 1.3 |
| Stress-cracking resistance in relation to 10% aqueous sodium hydroxide solution with 2% outer fiber strain | Large stress cracks, fracture after 5 h | Small stress cracks, no fracture after 2 weeks | Large stress cracks, fracture after 17 h | — | No stress cracks, no fracture after 4 weeks |

From the data in table 2 it is apparent that the polyester molding composition of the invention has very good resistance to hydrolysis (higher IV values than the comparative examples after aging in moist/warm conditions). The molding composition moreover has excellent stress-cracking resistance in relation to aqueous alkalis. Addition of the additives of the invention has absolutely no adverse effect on flame retardancy or on processing behavior (MVR values).

The invention claimed is:

1. A method of producing a stress-cracking-resistant and halogen-free flame-retardant polyester molding comprising the use of polyester molding compositions consisting of
A) from 35 to 88% by weight of a thermoplastic polyester
B) from 0.1 to 10% by weight of an epoxidized natural oil or fatty acid ester, or mixture of these, where the D) from 1 to 20% by weight of melamine cyanurate
E) from 0 to 60% by weight of other additional substances selected from the group consisting of carbon fibers, glass fibers, glass beads, amorphous silica, asbestos, calcium silicate, calcium metasilicate, magnesium carbonate, kaolin, chalk, powdered quartz, mica, varium sulfate, and feldspar,
where the total of the percentages by weight of components A) to E) is 100.

2. The method according to claim 1, where the content of epoxy groups in component B) is from 1 to 20% by weight.

3. The method according to claim 1, where the epoxy groups in component B) are not terminal.

4. The method according to claim 1, where component B) comprises epoxidized olive oil, linseed oil, soybean oil, palm oil, groundnut oil, coconut oil, tung oil, cod liver oil, or a mixture of these.

5. The method according to claim 1, where the epoxidized fatty acid ester B) comprises saturated or unsaturated aliphatic carboxylic acids having from 10 to 40 carbon atoms with saturated aliphatic alcohols having from 2 to 40 carbon atoms.

6. The method according to claim 1 wherein the thermoplastic polyester A) is a polyalkylene terephthate having an alcohol moiety with from 2 to 10 carbons and an aromatic dicarboxylic acid moiety wherein the aromatic ring is optionally substituted with a halogen or a $C_1$-$C_4$-alkyl group.

7. The method according to claim 1 wherein $R^1$ of component C) is hydrogen, methyl, or ethyl, and M=Al.

8. A method of producing a stress-cracking-resistant and halogen-free flame-retardant polyester molding comprising the use of polyester molding compositions consisting of
A) from 35 to 88% by weight of a thermoplastic polyester
B) from 0.1 to 10% by weight of an epoxidized natural oil or fatty acid ester, or mixture of these, where the epoxide equivalent weight of component B) in accordance with DIN EN ISO 3001 is from 100 to 400 g/eq
C) from 1 to 20% by weight of at least one metal salt of a phosphinic acid of the formula

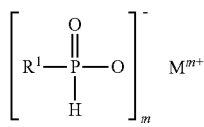 (I)

where
$R^1$=hydrogen, phenyl, methyl, ethyl, propyl, butyl, pentyl, octyl, phenyl, or

$R'$=hydrogen, phenyl, tolyl,
M=Mg, Ca, Al, Zn, and
m=from 1 to 4
D) from 1 to 20% by weight of melamine cyanurate
E) from 0 to 60% by weight of other additional substances selected from the group consisting of carbon fibers, glass fibers, glass beads, amorphous silica, asbestos, calcium silicate, calcium metasilicate, magnesium carbonate, kaolin, chalk, powdered quartz, mica, varium sulfate, feldspar, ethylene copolymers, ethylene-propylene copolymers, polyester elastomers, thermoplastic polyurethanes, esters or amides of saturated or unsaturated aliphatic carboxylic acids having from 10 to 40 carbon atoms with saturated aliphatic carboxylic acids having from 10 to 40 carbon atoms with saturated aliphatic alcohols or amines having from 2 to 40 carbon atoms, stabilizers, oxidation retarders, agents to counteract decomposition by heat and decomposition by ultraviolet light, lubricants, mold-release agents, colorants, nucleating agents, plasticizers, and fluorine-containing ethylene polymers,
where the total of the percentages by weight of components A) to E) is 100.

9. The method according to claim 8, where the content of epoxy groups in component B) is from 1 to 20% by weight.

10. The method according to claim 9, where the epoxy groups in component B) are not terminal.

11. The method according to claim 8, where the epoxy groups in component B) are not terminal.

12. The method according to claim 8, where component B) comprises epoxidized olive oil, linseed oil, soybean oil, palm oil, groundnut oil, coconut oil, tung oil, cod liver oil, or a mixture of these.

13. The method according to claim 8, where the epoxidized fatty acid ester B) comprises saturated or unsaturated aliphatic carboxylic acids having from 10 to 40 carbon atoms with saturated aliphatic alcohols having from 2 to 40 carbon atoms.

14. A stress-cracking-resistant flame-retardant molding, fiber, or foil obtained according to claim 8.

15. An injection molding, coated molding, molding for electrical and electronic uses, or motor-vehicle component, obtained according to claim 8.

16. The method according to claim 8 wherein the thermoplastic polyester A) is a polyalkylene terephthate having an alcohol moiety with from 2 to 10 carbons and an aromatic dicarboxylic acid moiety wherein the aromatic ring is optionally substituted with a halogen or a $C_1$-$C_4$-alkyl group.

17. The method according to claim 8 wherein the thermoplastic polyester A) is selected from the group consisting of polyethylene terephthalate, polypropylene terephthalate, polybutylene terephthalate, and mixtures thereof.

18. The method according to claim 8 wherein the thermoplastic polyester A) is a polyethylene terephalate, a polybutylene terephthalate, or a mixture thereof further comprising 1,6-hexanediol, 2-methyl-1,5-pentanediol or a mixture thereof as an additional monomer in an amount of up to 1% by weight of the polyester A).

19. The method according to claim 8 wherein $R^1$ of component C) is hydrogen, methyl, or ethyl.

20. The method according to claim 19 wherein M=Al.

* * * * *